United States Patent [19]

Baatrup et al.

[11] 4,006,663
[45] Feb. 8, 1977

[54] HYDRAULIC CONTROL MEANS, ESPECIALLY A STEERING MEANS

[75] Inventors: Johannes Vagn Baatrup, Sonderborg; Thorkild Christensen, Nordborg, both of Denmark

[73] Assignee: Danfoss A/S, Nordborg, Denmark

[22] Filed: Apr. 2, 1975

[21] Appl. No.: 564,278

Related U.S. Application Data

[63] Continuation of Ser. No. 438,003, Feb. 6, 1974, abandoned.

[30] Foreign Application Priority Data

Feb. 7, 1973    Germany .................... 2305835

[52] U.S. Cl. ........................... 91/29; 91/6; 91/420
[51] Int. Cl.² ............................ F15B 13/042
[58] Field of Search ............ 91/420, 6, 29; 60/428; 137/106, 110, 87, 606

[56] References Cited

UNITED STATES PATENTS

| | | | |
|---|---|---|---|
| 2,618,121 | 11/1952 | Tucker | 91/42 D |
| 2,906,246 | 9/1959 | Di Tirro et al. | 91/6 |
| 3,135,170 | 6/1964 | Glaser | 91/461 |
| 3,164,959 | 1/1965 | Gondek | 91/42 D |
| 3,364,823 | 1/1968 | Benjamin et al. | 91/42 D |
| 3,561,488 | 2/1971 | Byers | 137/625.62 |
| 3,564,848 | 2/1971 | Baatrup et al. | 180/79.2 R |
| 3,580,281 | 5/1971 | Petersen | 91/6 X |
| 3,771,424 | 11/1973 | Allen et al. | 91/448 X |

FOREIGN PATENTS OR APPLICATIONS 644,545    5/1937    Germany ...................... 91/420

*Primary Examiner*—Irwin C. Cohen

[57] ABSTRACT

The invention relates to a hydraulic control apparatus of the type used in vehicle steering systems. In all such systems there is a reversible type hydraulic motor connected to the steering linkage. The motor has complementary expansible chambers. With the use of control means pressurized fluid is selectively delivered to one chamber which is caused to expand concomitantly with the collapsing of the other chamber from which fluid is returned to a sump. Forces transmitted to the hydraulic motor through the steering linkage by reason of the wheels striking objects such as stones or curbs cause an objectionable effect by reason of fluid being forced out of the motor back into the system. This effect is avoided by providing two valve assemblies for the two ports of the reversible motor which function in the absence of a steering command as ordinary one way check valves which prevent the undesired flow of fluid from either of the motor ports. Each of the valve assemblies has pressure responsive means and is openable when the pressure responsive means is acted upon by pressure. The pressure responsive means of each valve assembly is fluidly connected to the upstream side of the other valve assembly so that both valve assemblies will be open during the normal power steering operation wherein pressurized fluid is admitted to one side of the actuating motor and withdrawn from the other side thereof.

1 Claim, 7 Drawing Figures

HYDRAULIC CONTROL MEANS, ESPECIALLY A STEERING MEANS

This is a continuation application of Ser. No. 438,003 filed Feb. 6, 1974, and now abandoned.

The invention relates to a hydraulic control means, especially a steering means, having a motor to which pressurized fluid can be supplied by a feed pump by way of a power circuit and a valve arrangement.

A control means for a machine-tool is known (U.S. Pat. No. 3,135,170), in which the valve arrangement is a reversing valve with a valve slide which is displaceable in one or other direction with the aid of a hand pump. The slide rides over not only openings in the power circuit but also openings in a control circuit, so that the flow of fluid through the power circuit is approximately proportional to the flow in the control circuit. In the non-operative position, two peripheral faces of the valve slide cover the openings leading to the motor.

Also known is a control means (U.S. Pat. No. 3,561,488), in which the valve arrangement again comprises at least one valve slide which is displaceable by the pressure in a control circuit. In this system the pressurized medium in the control circuit likewise passes to the connecting pipes of the motor. Again, in the non-operative position the openings leading to the motor are closed by peripheral parts of the slide.

A problem with such control means, and especially with steering means, resides in the fact that external forces impinge upon the motor and tend to displace this in an undesirable manner, either by imparting movement to the stationary motor or by causing the moving motor to accelerate ("overrun"), decelerate, or even to "kickback". The above-mentioned control means are capable of preventing the motor from moving only when the valve slides are in their non-operative positions. However, if use is made of valve slides which, in the neutral position, do not close the openings leading to the motor, a safe condition is not created even when the motor in stationary valve slides of this kind are used for example in those systems in which the feed pump delivers uninterruptedly a substantially continuous quantity of fluid which is either passed by the slide to the tank through a by-pass line, or is divided in a predetermined ratio as between the power circuit and the return line to the tank ("open center circuit").

The object of the invention is to provide a control means of the initially described kind in which, independently of a valve slide common to the connecting pipes, some or all of the effects of external forces on the movement of the motor can be completely or almost completely eliminated.

According to the invention this object is achieved by providing in the return connecting pipe of the motor a cut-off valve which opens under the effect of the pressure in the feed connecting pipe of the motor or of a value corresponding to that pressure.

This cut-off valve is therefore normally closed. It opens only when pressure is supplied to the motor on the feed side. An external force that is applied to the stopped motor in the feed direction does not therefore lead to any displacement of the motor. In order to prevent displacement of the stopped motor by a force acting in the opposit direction, use may be made of a normal non-return valve provided in the feed connecting pipe and opening towards the motor.

In the case of a control means having a reversible motor, cut-off valves are advantageously provided in both of the connecting pipes of the motor, each of which valves opens under the effect of the pressure in the other connecting pipe of the motor or a value corresponding to that pressure, and each valve being combined with a non-return valve which opens towards the motor. Thus, a cut-off valve and a non-return valve are provided for each working direction of the motor.

In this arrangement it is particularly advantageous if the cut-off valves take the form of non-return valves and are each provided with an additional actuating device which opens the closure member under the effect of the pressure in the other connecting pipe of the motor. Thus a single valve serves as a non-return valve in one direction of flow and as a cut-off valve in the othr direction of flow.

In accordance with a further feature of the invention, the valve arrangement determines the amount of fluid that flows through the motor, and the cut-off valve in the return connecting pipe is also designed as a flow-restricting element which offers differing resistance to flow in intermediate positions and, in the closing direction, is additionally affected by the pressure in the return connecting pipe of the motor or by a value corresponding to that pressure.

If the motor is to move at a particular speed as a result of the control of the quantity of fluid, an external force acting in the direction of this movement leads to undesirable acceleration. This causes a pressure on the return side to be raised and that on the feed side to be reduced. Since the opened cut-off valve is influenced by the pressure difference, it moves into an intermediate position in which a predetermined throttling effect occurs. Consequently the pressurized medium cannot flow away as rapidly as previously, and the accelerated movement is braked.

Particular advantage accrues if the cut-off valves in the two connecting pipes are designed as flow-restricting elements which offer differing resistance to flow in the intermediate positions, and if the particular cut-off valve in the feed connecting pipe can be set, with the aid of a control device, to give a resistance to flow that corresponds to the required quantity of flow. Cut-off valves similar to each other can therefore be provided in both of the connecting pipes. The similar flow-restricting elements are used in the return pipe for preventing overrun, and in the feed pipe for adjusting the quantity of flow to the required level.

Particular advantages are achieved in a control means in which the control of the valve arrangement is achieved by means of a hydraulic control circuit which has a device for adjusting the control quantity and connecting pipes running to the motor. In such a system, a cut-off valve can be provided in the return connecting pipes or in both connecting pipes of the motor both in the power circuit and in the control circuit. Thus the problems arising in both circuits are solved in the same manner.

In this arrangement the closure members of the cut-off valve of the power circuit and the cut-off valve of the control circuit can be made in one piece. Then, only one actuating device is required for the two cut-off valves. Furthermore, the resistance to flow in the two cut-off valves varies proportionally. Thus, on the feed side proportionality always exists between the adjusted control quantity and the operating quantity flowing in the power circuit. On the return side the quantity flowing from the motor is divided approximately in the same ratio.

From the constructional point of view, it is preferred to provide the cut-off valve with a valve slide which, by means of a shoulder, rides over an opening communicating with a connection of the motor, and with the aid of a piston, the free end-face of which communicates with the other connection of the motor optionally by way of a flow-restriction point, is displaceable into the open position against the force of a return spring.

When the piston and valve slide are formed separately, and when the connecting pipe to the power or control circuit terminates between their mutually facing end-faces, and the free end-face of the valve slide is connected, optionally by way of a flow-restricting point, to the associated connection of the motor, a non-return and cut-off valve of very simple construction is obtained and this can be opened automatically with the aid of the piston it if is disposed in the return connecting pipe.

The cross-section of the piston is expediently greater than the cross-section of the valve slide. This ensures that the cut-off valve opens in the correct manner.

Advantageously, axially extending flow-restricting slots begin at the shoulder. There flow-restricting slots may have a preferably triangular cross-section which tapers in the direction away from the shoulder. With flow-restricting slots of this kind, it is possible to adjust to any required flow resistance. In particular, it is also possible to achieve a very slight throttling effect such as is required in countering the overrun effect in the return pipe.

The valve slide in the power circuit preferably has a larger number of flow-restricting slots than the valve slide in the control circuit. In this way a required amplification between the control quantity and the power quantity in achieved.

In a preferred form of construction, the cut-off valve has, on that side presented to the power or control circuit, a disc valve, the disc of which is mounted on the valve slide in such manner that the disc valve will open before the valve slide has established the connection with the motor. The use of a disc valve results in a very tight seal which is generally not achievable with a valve slide. This ensures that the stationary motor does not execute any undesirable movements even when fairly high external forces are applied.

In a further preferred form of construction, a reversing valve is connected between the feed pump and the tank on the one hand and between the two cut-off valves of the power circuit on the other and this reversing valve has a pressure face, acted upon by the pressure in the connecting pipes between the device for adjusting the control quantity and the cut-off valves in the control circuit and a pressure face of like size which is acted upon by the pressure in the supply-side connecting pipe between the reversing valve and the cut-off valves in the power circuit. This reversing valve not only has the effect of causing the pressurized fluid to be supplied to the motor in the particular required direction, but it also acts as a pressure comparator which ensures that the same pressure prevails at the feed side in front of the cut-off valves of the power circuit and of the control circuit.

Advantageously, the reversing valve has a valve slide which has two concentric blind-end bores, each of which in connected at its inner end to one of the two operating annular grooves of the valve slide and accommodates a pin which is guided in the casing in a bore connected to one of the connecting pipes of the control circuit. This results in a very small displacement volume for moving the reversing valve. Consequently the lost-motion distance that the adjusting device for the control quantity has to travel before displacement of the working cylinder occurs is small. In this arrangement, the pin is preferably made of two parts, one of which is guided in the blind-end bore and the other in the bore in the casing. This permits relatively large manufacturing tolerances as regards the concentricity of the valve slide, the bore that accommodates it, the blind-end bore and the bore in the casing.

It is also preferred that the connecting pipe of the power circuit that runs from the reversing valve should pass between the mutually facing end-faces of the piston and valve slide of the cut-off valve. This ensures that no pressurized fluid from the device for adjusting the control quantity is required for the initial displacement of the cut-off valve, but only fluid from the power circuit. This too leads to a reduction of the lost motion of the adjusting device.

The invention will now be described by reference to some forms of construction shown in the annexed drawing, in which.

Figure 1:
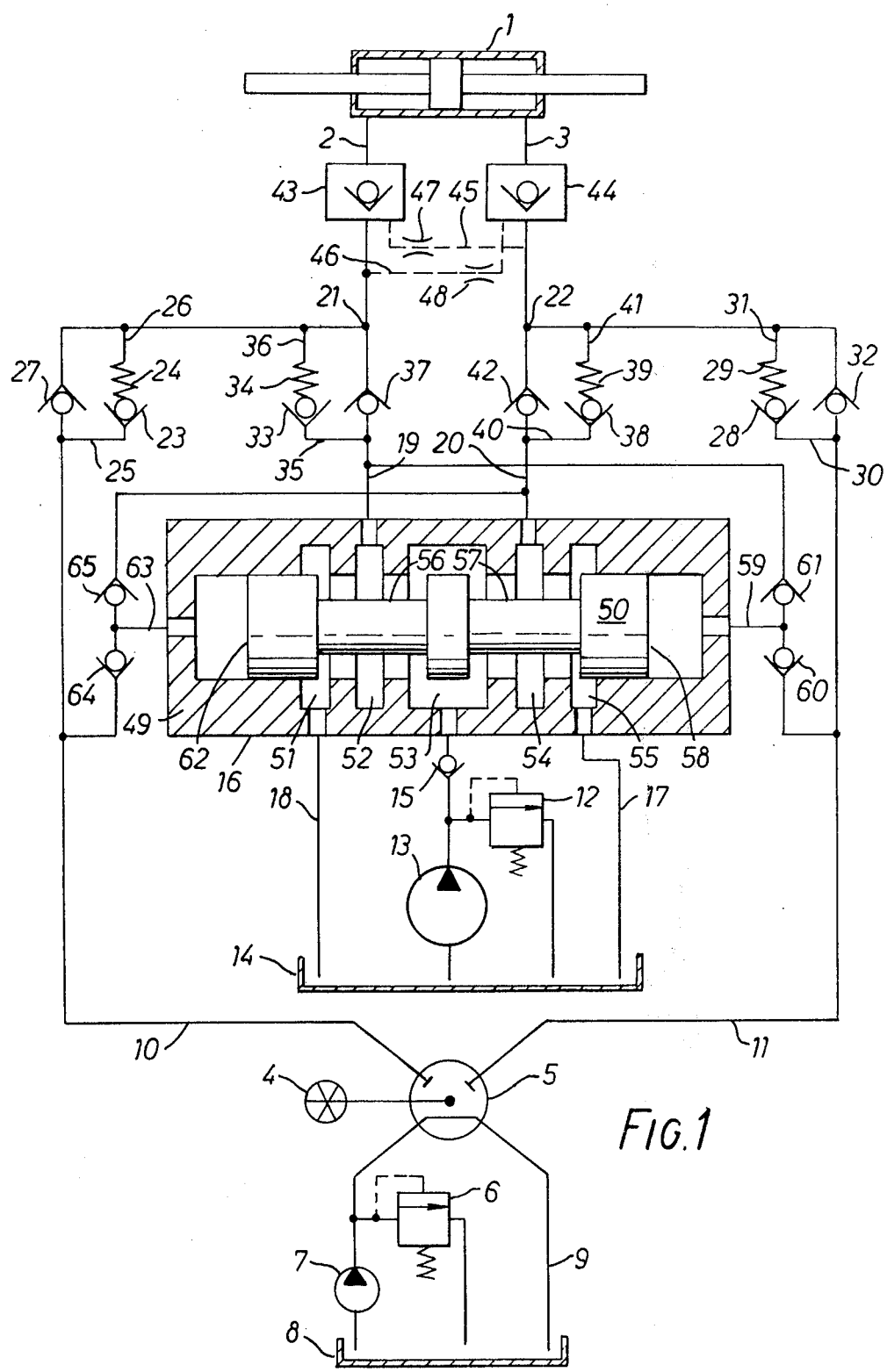
FIG. 1 is a diagrammatic illustration of a first embodiment of the invention.

In the embodiment illustrated in FIG. 1, there is provided a motor 1 having two connecting pipes 2 and 3. The motor is operated with the aid of a steering wheel 4 which displaces a device 5 for adjusting the control quantity. This device can be of normal construction such as described for example in U.S. Pat. No. Re. 25,126. A control pump 7, protected by an excess-pressure regulator 6, delivers pressurized fluid from a tank 8. Depending upon the position of the device 5, this pressurized fluid passes directly back to the tank by way of a return pipe 9, or to the motor 1 by way of the control pipes 10 and 11, the other control pipe acting as a return pipe. Furthermore, there is provided a feed pump 13 which is likewise protected by an excess-pressure regulator 12 and supplies pressurized fluid from a tank 14 to a reversing valve 16 through a non-return valve 15. Depending upon the position of the reversing valve, the pressurized fluid is returned directly to the tank 14 by way of one of the return pipes 17 and 18, or to the motor 1 by way of one of the power pipes 19 and 20, the other power pipe acting as the return pipe. The fluids in the control circuit and the power circuit are brought together and separated at points 21 and 22 respectively.

Provided in the control pipe 10 is a control circuit throttle valve 23 which is loaded by a spring 24 and is controlled in dependence upon the pressure difference in the pipe sections 25 and 26 upstream and downstream respectively of this valve. Furthermore, this control circuit throttle valve 23 is bridged by a non-return valve 27 which opens in the opposite direction. The same arrangement is used in the case of a control circuit throttle valve 23 having a spring 29 and disposed between the pipe sections 30 and 31, this valve 23 also being bridged by a non-return valve 32. In a similar manner a power circuit throttle valve 33 with a spring 34 is disposed between two pipe sections 35 and 36, this valve being bridged by a non-return valve 37, and likewise a second power circuit throttle valve 38 with a spring 39 is disposed between the pipe sections 40 and 41 and is bridged by a non-return valve 42.

A cut-off valve 43 is provided in the connecting pipe 2, and a cut-off valve 44 in the connecting pipe 3. Both operate as simple non-return valves which open in the direction of the motor 1. However, they are also brought into the open position by pulse lines 45 and 46 respectively, each having a flow-restricting point 47 and 48 respectively, when the other connecting line is under pressure.

The reversing valve 16 has a casing 49 and a slide 50 which is shown in its neutral position. The casing 49 has five annular grooves 51 - 55 which are connected respectively to the return pipe 18, the power pipe 19, the feed pump 13, the power pipe 20 and the return pipe 17. The slide 50 has two annular working grooves 56 and 57 which, in the non-operating position, extend sufficiently over the annular grooves 51, 53 and 55 to cause the pressurized fluid delivered by the feed pump 13 to be returned to the tank 14 through a by-pass. If the slide 50 is displaced from the medium position, the cross-sections over which the grooves are in register change, and a part of the pressurized fluid dependent upon the position of the slide flows through the motor 1, and only the remaining part is returned directly to the tank.

The slide 50 has a first pressure face 58 which, by way of a pipe 59 and a first non-return valve 60 communicates with the control pipe 11, and by way of a second non-return valve 61, with the power pipe 19. Also provided is a second pressure face 62 which, by way of a pipe 63 and a first non-return valve 64, communicates with a control pipe 10, and by way of a second non-return valve 65, with the power pipe 20.

This hydraulic control means operates in the following manner; if the device 5 for adjusting the control quantity is so set that a particular control quantity flows through the pipe 11, the control circuit throttle valve 28 opens to an extent corresponding to this quantity. The pressure in the control pipe 11 is passed on through the non-return valve 60 to the pressure face 58 of the reversing valve slide 50. The slide 50 moves to the left. Pressurized power fluid therefore passes into the power pipe 20. Since the pressure of this fluid acts on the pressure face 62 by way of the non-return valve 65, the slide 50 finally occupies the position in which it acts as a pressure comparator which keeps the pressure in the power pipe 20 equal to the pressure in the control pipe 11. Since the pressure in the pipe sections 31 and 41 is the same, the power circuit throttle valve 33 is subjected to the same pressure differential as the control circuit throttle valve 23. The power circuit throttle valve 36 therefore opens to a precisely defined extent which stands in a particular relationship to the control quantity, generally a proportional multiple thereof. The combined control and power quantities pass through the cut-off valve 44 in the feed connecting pipe 3 to one side of the motor 1. As a result of the pressure obtaining in the connecting pipe 3, the cut-off valve 43 in the return connecting pipe 2 is also opened. The fluid displaced from the motor 1 is divided at the point 21 and part of it flows through the non-return valve 37 and the reversing valve 16 to the tank 14 and part through the non-return valve 27 and the adjusting device 5 to the tank 8. If the control quantity is increased, the power quantity increases correspondingly. If the device 5 for adjusting the control quantity is displaced in the opposite direction, so that the control quantity flows through the control pipe 10, similar conditions to those described above are established but in the opposite direction of flow.

Although both the device 5 for adjusting the control quantity and the reversing valve 16 have a by-pass path in the neutral position, the motor 1 is safely cut-off from the power and control circuits, in this position, by the cut-off valves 43 and 44, so that an external load acting on the motor is not able to move it.

Figure 2:
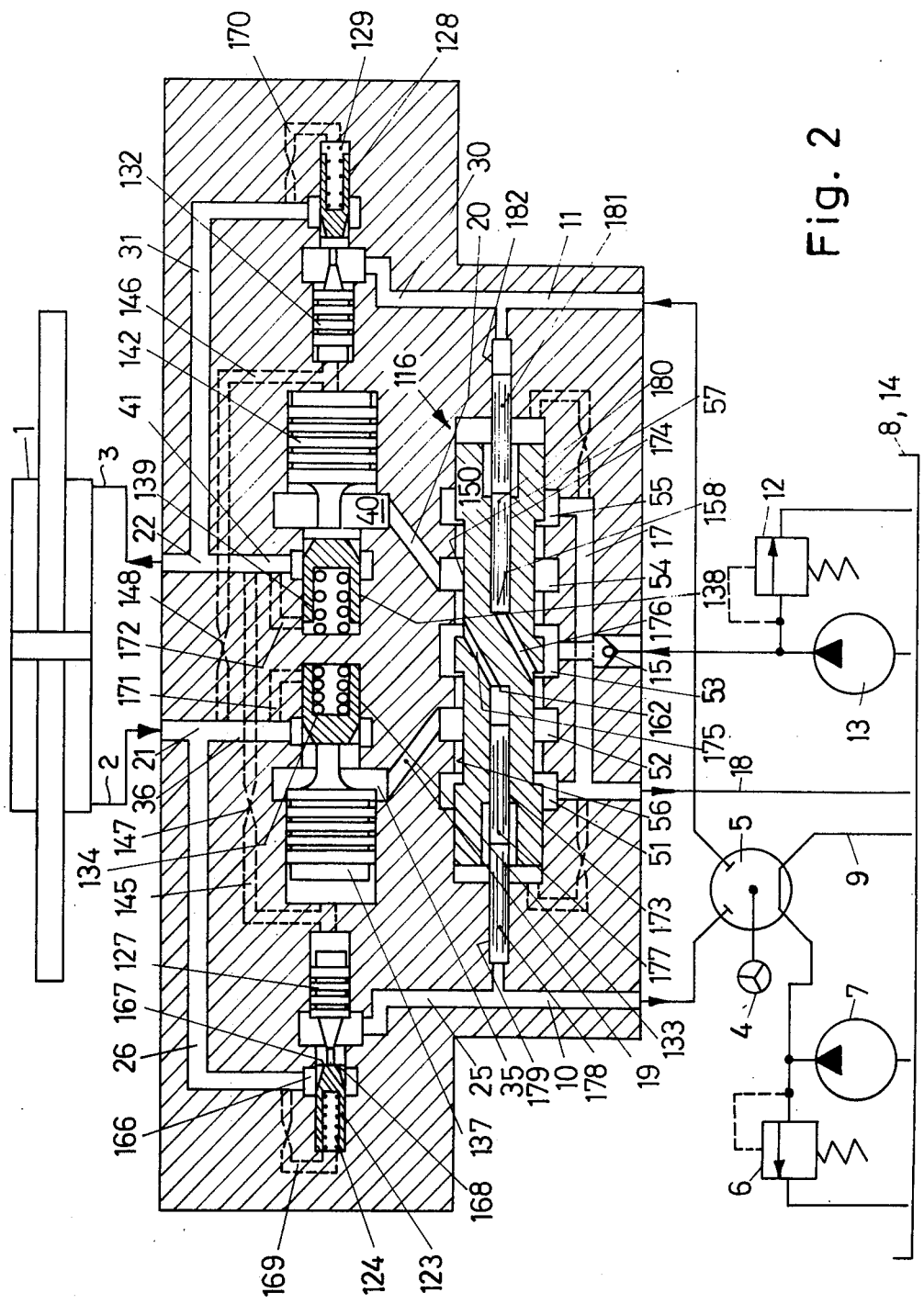
FIG. 2 is a diagrammatic illustration of a second embodiment of the invention.

In the embodiment illustrated in FIG. 2, the same reference numerals as in FIG. 1 are used for like or similar parts. Where a part performs a similar function to the equivalent part seen in FIG. 1, it is designated by a reference numeral that is increased by 100 as compared with that of the part in FIG. 1. FIG. 2 shows an operating position in which the motor 1 is just beginning to move backwards.

Figure 4:
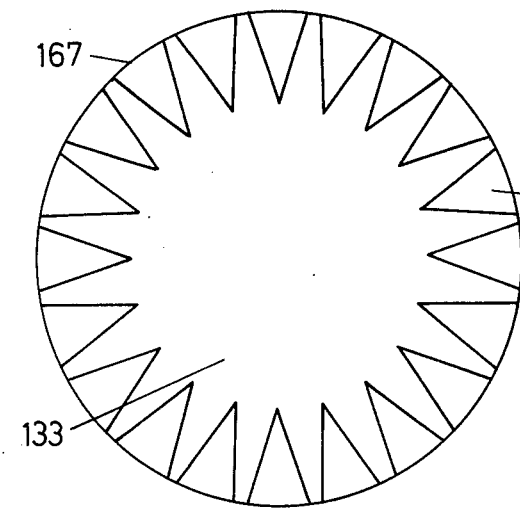
FIG. 4 shows, on a greater scale, an end view of a cut-off valve in the power circuit.
Figure 3:
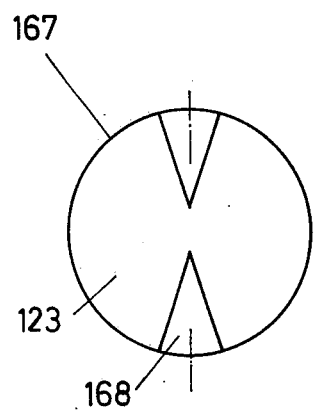
FIG. 3 shows, on a greater scale, an end view of a cut-off valve in the control circuit.

In this arrangement, the cut-off valves 43 and 44 are replaced by providing throttle cut-off valves 123, 128, 133 and 138 in the control pipes 10 and 11 and in the power pipes 19 and 20. Here the valve slides close an opening 166 leading to the motor when they are in the non-operating position, but each has a shoulder 167 whereby this opening can be controlled. Formed at the periphery of the slide are throttle slots 168 which taper in the direction away from the shoulder and are of triangular cross-section. FIG. 3 illustrates the arrangement of the control circuit throttle cut-off valve 123 having two such throttle slots 168, and FIG. 4 shows a throttle cut-off valve 133 for the power circuit having 20 such throttle slots 168.

When these throttle cut-off valves are disposed in the return pipe they are positively opened by the pistons 127, 132, 137 and 142 respectively. Between the slide of each valve and the piston there terminate the control pipe 10 or 11 and the power pipe 19 or 20. The pressure in each of the other connecting pipes 3 and 2 acts on the free end face of the piston through the pulse line 145 and 146 respectively. The pressure of each associated connecting pipe 2 and 3 acts on the free end face of each valve slide through the pulse lines 169, 170, 171 and 172 respectively. A flow-restricting point can also be provided in each of these pulse lines. The cross-section of each of the pistons is greater than that of the associated valve slide.

The reversing valve 116, which also acts as a pressure comparator, has a slide 150 which has two concentric blind-end bores 173 and 174. The inner ends of these bores are connected by ducts 175 and 176 to the annular operating grooves 56 and 57 of the slide 60. Guided in the blind-end bore 173 is the first part 177 of a pin, the second part 178 of which is guided in a bore 179 in the casing, which bore is connected to the control pipe 10. Guided in the blind-end bore 174 is the first part of a pin 180, the second part 181 of which is guided in a bore 182 in the casing which latter bore is corrected to the control pipe 11.

This arrangement results in a mode of operation which differs from that of the arrangement of FIG. 1 in the following respects. In the non-operating position, the connecting pipes 2 and 3 are completely cut off from the rest of two power and control circuits by the throttle cut-off valves 123, 128, 133 and 136. When, with the aid of the device 5 for adjusting the control quantity, such quantity is passed through the pipe 11 in the direction indicated by the arrow, the throttle cut-off valve 128 opens against the force of the spring 129. The pressure occurring in the control pipe 11 displaces the slide 150 leftwards by way of the two-part pin 180, 181. The pressure in the power pipe 20 acts as a counter-force on the pressure face 162 by way of the duct 175. The operating pressure in the pipe 20 is therefore equated with the control pressure in the pipe 11. Accordingly, the throttle cut-off valve 138 also opens to a precisely defined extent. Pressurized fluid from the control circuit and from the power circuit therefore passes jointly through the connecting pipe 3 and into the motor 1. By way of the pulse line 145, the pressure in the connecting pipe 3 acts on the free end-faces of the two pistons 127 and 137. These therefore force the two throttle cut-off valves 123 and 133 into the open position. Fluid from the motor 1 can therefore flow back unrestrictedly to the tanks 8 and 14 through the connecting pipe 2 and by way of the power pipe 19 and the control pipe 10, the throttle slots in the throttle cut-off valves 123, and 133 again dividing the control quantity and the power quantity approximately in the original ratio.

If now an external force applied to the motor tends to move it i.e. accelerate it to the left then the pressure in the connecting pipe 2 rises, whereas that in the connecting pipe 3 drops. This results in the pressure equilibrium in the system 123, 127 and 133, 137 varying so that the throttle cut-off valves move slightly in the closing direction. Consequently the return pipe is throttled, i.e. the acceleration caused by the external force is offset.

If the external force acts in the opposite direction on the motor, the movement of the motor is delayed. The pressure in the connecting pipe 3 rises, whereas the pressure in the connecting pipe 2 drops. The rise in pressure results in a pressure increase in the control pipe 11 which leads to the slide 150 being displaced to the left and therefore to increased effectiveness of the power circuit, so that this external force is also offset.

The possibility of the motor being displaced by external forces in a direction opposite to that set at the adjusting device 5 is completely excluded since this would require the pressure in the connecting pipe 3 to be greater than the pressure in the control pipe 11 or the power pipe 20. In such power conditions, however, the throttle cut-off valves 128 and 138 are closed or will immediately close.

The control means illustrated is also suitable for emergency operation since a motoring motor, normally present in the adjusting device 5, can also be driven as a pump with the aid of the steering wheel 4. Should the control pump 7 fail, the feed pump 13 can therefore be further controlled. Should the feed pump 13 or even both pumps 7 and 13 fail, emergency operation can still be maintained with the aid of the steering wheel 4 and of the motoring motor in the control device 5, which motor acts as a pump. The drawing shows the flow conditions in the case of a motor moving to the left. Corresponding conditions apply in the case of a motor to be moved to the right.

Figure 5:
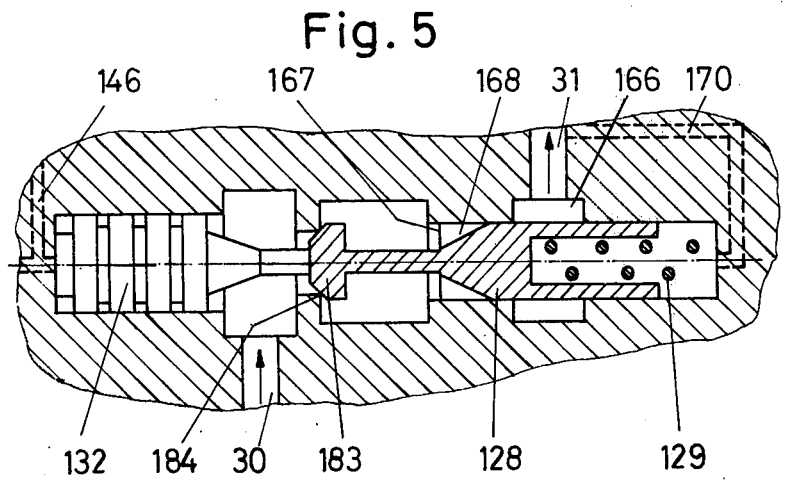
FIG. 5 shows, on a greater scale, a further form of cut-off valve.

FIG. 5 shows that for the purpose of intensifying the blocking action, the slide of the throttle cut-off valve 128 can also be provided with a disc 133 which cooperates with a valve seat 184. In this way there is obtained an upstream disc valve which will have opened before the throttle slots 168 are in communication with the opening 166.

Figure 6:
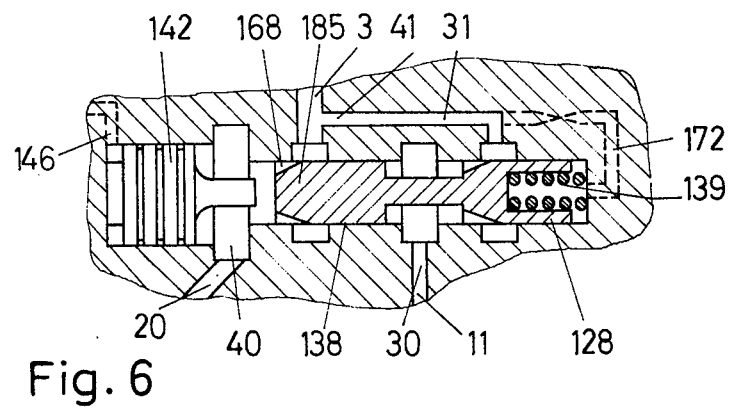
FIG. 6 is a detail drawing showing a modified form of the embodiment of FIG. 2.

The modified form of the embodiment of FIG. 2 that is illustrated in FIG. 6 differs from said embodiment mainly in that the sides of the throttle cut-off valve 123 for the control circuit and the throttle cut-off valve 138 for the power circuit are combined to form a common double slide 185. This double slide then has for example twenty throttle slots 168 between the sections 40 and 41 of the power pipe 20, and two throttle slots 168 between the sections 30 and 31 of the control pipe 11. In this case only one piston 142 and one spring 139 are required for the two throttle cut-off valves 128 and 138.

Figure 7:
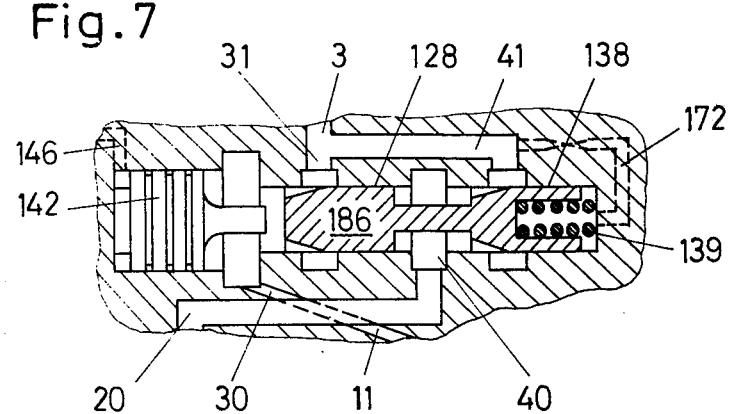
FIG. 7 is a detail drawing showing a further modified form of the embodiment of FIG. 2.

FIG. 7 illustrates a double slide 186 for the throttle cut-off valve 128 and 138 respectively of the control circuit and the power circuit, in which valves the connections of the control pipe 11 and the power pipe 20 have been transposed. In this case the zone between the piston 142 and the slide 186 is acted upon by the pressure in the section 30 of the control pipe 11 and not by the pressure in the section 40 of the power pipe 20, which pressure is the same in this form of construction.

In many cases it will also be possible to dispense with the return path opening devices 27, 32, 127, 132 for the control circuit, since the return path opening devices 37, 42, 137, 142 for the power circuit uncover a sufficiently large cross-section to enable the pressurized fluid supplied through the control circuit also to be carried away. However, it is then preferred to connect the two tanks 8 and 14 to each other.

In the embodiment illustrated in FIG. 2, the pressure comparator operates with a 1:1 ratio, so that the same pressure obtains upstream of the control circuit throttle valve and the power circuit throttle valve. The ratios of the control quantity to the power quantity can also be varied with the aid of other pressure ratios.

We claim:

1. A hydraulic power steering subassembly comprising a reversible motor having complementary expansible chambers with first and second ports for said chambers, first control and power passages connected to said first port, second control and power passages connected to said second port, first control and power throttle slide valves in said first passages biased towards opening positions by pressurized fluid in said first passages, second control and power throttle slide valves in said second passages biased towards opening positions by pressurized fluid in said second passages, resilient means biasing said throttle slide valves towards closed position, a first pair of back-to-back piston means for pressure biasing said first throttle slide valves in opening directions, a second pair of back-to-back piston means for pressure biasing said second throttle slide valves in opening direction, the pressure responsive area of each of the piston means controlling the power throttle slide valves being greater than the area of the piston means controlling the control throttle slide valves, a first pulse line for transmitting pressure from said first power passage to a point between said second piston means to modulate the openings of said second throttle slide valves in accordance with the pressure in said first power passage, a second pulse line for transmitting pressure from said second power passage to a point between said first piston means to modulate the openings of said first throttle slide valves in accordance with the pressure in said second power passage.

* * * * *